United States Patent [19]
Yoshida

[11] Patent Number: 5,435,235
[45] Date of Patent: Jul. 25, 1995

[54] BREAD MAKING MACHINE

[75] Inventor: Shinji Yoshida, Daito, Japan

[73] Assignee: Funai Electric Co., Ltd., Osaka, Japan

[21] Appl. No.: 354,010

[22] Filed: Dec. 5, 1994

[30] Foreign Application Priority Data

Dec. 6, 1993 [JP] Japan .................. 5-305633

[51] Int. Cl.6 .................. A21D 8/00; A47J 27/00; G06F 15/20
[52] U.S. Cl. .................. 99/327; 99/331; 99/344; 99/348; 364/400; 364/557; 366/98; 366/146; 366/314; 366/601
[58] Field of Search .................. 99/325-328, 99/331-333, 342, 344, 468, 486; 219/492, 494, 501; 364/140, 141, 400, 477, 550, 557; 366/98, 144-146, 314, 601; 426/231-233, 503, 504, 523

[56] References Cited

U.S. PATENT DOCUMENTS

| 4,538,509 | 9/1985 | Ojima et al. | 366/98 |
| 4,762,057 | 8/1988 | Hirota et al. | 99/348 |
| 4,776,265 | 10/1988 | Ojima | 99/348 |
| 4,903,587 | 2/1990 | Nagasaka et al. | 99/325 |
| 4,903,589 | 2/1990 | Aoyama | 99/331 |
| 4,951,559 | 8/1990 | Arao et al. | 366/146 |
| 4,957,040 | 9/1990 | Nakakura et al. | 99/331 |
| 4,984,512 | 1/1991 | Takahashi et al. | 99/327 |
| 5,019,972 | 5/1991 | Rim | 364/400 |
| 5,076,153 | 12/1991 | Takahashi et al. | 99/327 |
| 5,351,606 | 10/1994 | Matsuzaki | 366/601 |

FOREIGN PATENT DOCUMENTS 4-11630 3/1992 Japan .

Primary Examiner—Timothy F. Simone
Attorney, Agent, or Firm—Bacon & Thomas

[57] ABSTRACT

A bread making machine having a bread case being releasably attached to an oven chamber and receiving ingredients therein and subjecting the ingredients to bread making processes such as a kneading process, a leavening process, and a baking process within the same oven chamber. In the bread making machine, the bread making operation is stopped temporarily before the baking process and then resumed.

7 Claims, 6 Drawing Sheets

BREAD MAKING MACHINE

BACKGROUND OF THE INVENTION

1. Field of the Invention

The invention relates to a bread making machine. More particularly, the invention is directed to a bread making machine that bakes bread by preparing a dough by subjecting ingredients poured into a bread case to such bread making processes as a kneading process and a leavening process, and then by baking the dough.

2. Description of the Related Art

As disclosed in Japanese Utility Model Examined Publication No. Hei. 4-11630, a method in which a kneading process, a leavening process, and a baking process are continuously performed within a single oven chamber has heretofore been known. This method is characterized as selecting a single kind of bread by a menu button from a plurality of kinds of bread such as plain bread and French bread, and automatically performing the processes from the kneading to baking processes upon pressing of a start button after ingredients are poured into a bread case.

The aforementioned conventional method is advantageous in baking bread such as white bread and French bread for which a program set in the bread making machine can handle all the processes from the start to the end. However, this method is disadvantageous in baking jam buns, bean-jam buns, cream buns, croissants, or the like. That is, the bread making process for these kinds of bread involves the steps of: preparing a dough by the bread making machine; specially arranging the dough after the dough is taken out of the bread making machine; and baking the specially arranged dough by a heating device such as an oven, and this whole bread making process is laborious.

In addition, the heating device, which is a separate device for baking, is necessary, which additionally requires the setting of temperature and time therefor.

SUMMARY OF THE INVENTION

The invention has been made to overcome these problems. Accordingly, an object of the invention is to provide a bread making machine capable of baking bread with a simple operation without using a separate heating device when buns such as jam buns or croissants which require special arrangements during the bread making process are baked.

To achieve the above object, the invention provides a bread making machine having a bread case being releasably attached to an oven chamber and receiving ingredients therein and subjecting the ingredients to bread making processes such as a kneading process, a leavening process, and a baking process within the same oven chamber, the bread making machine including: kneading means for mixing and kneading the ingredients to make a dough; heating means for baking the dough; control means for not only controlling the kneading process, the leavening process, and the baking process, but also stopping a bread making operation upon input of a first signal and resuming the bread making operation upon input of a second signal; pausing means for applying the first signal to the control means to stop the bread making operation before the baking process; and resuming means for applying the second signal to the control means to resume the bread making operation stopped by the pausing means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Embodiments of the invention will now be described with reference to the accompanying drawings.

Figure 1:
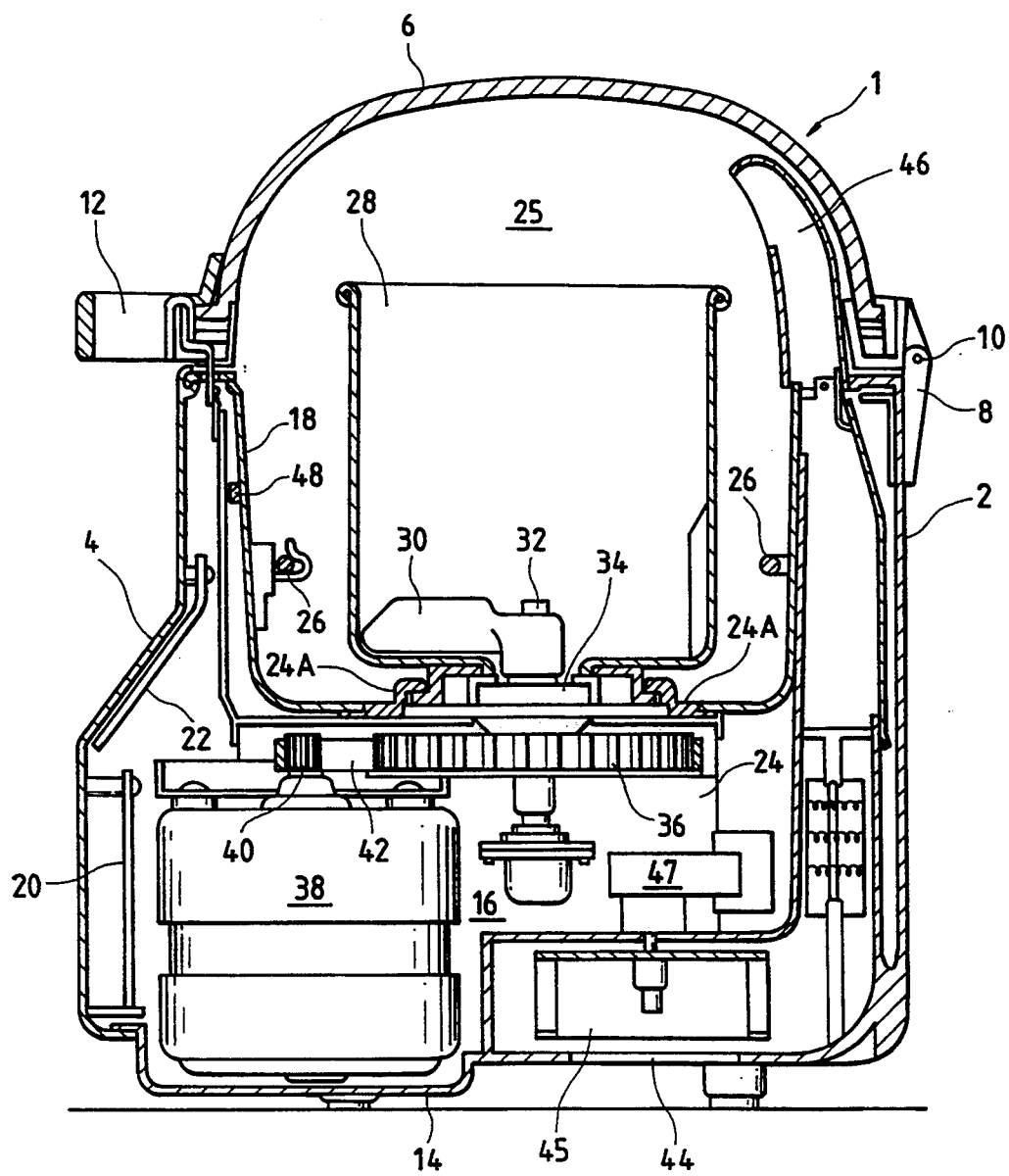
FIG. 1 is a side sectional view showing a general structure of a bread making machine, which is a first embodiment of the invention.

FIG. 1 is a side sectional view showing a general structure of a bread making machine, which is a first embodiment of the invention.

A bread making machine 1 shown in FIG. 1 includes a substantially cylindrical main body 2 of the bread making machine. An operation panel 4 for setting time, programs, and the like is attached to the main body 2 at the center on the front side thereof. A dome-like lid 6 made of a piece of transparent glass is put on top of the main body 2 so as to be allowed to open and close. It is the main body 2 and the lid 6 that constitute tile closed container type bread making machine 1.

The rear end of the lid 6 is attached to a bracket 8 disposed on the main body 2 so as to be pivotable about a pivot pin 10, and a handle 12 is arranged on the front end to open and close the lid.

Figure 2:
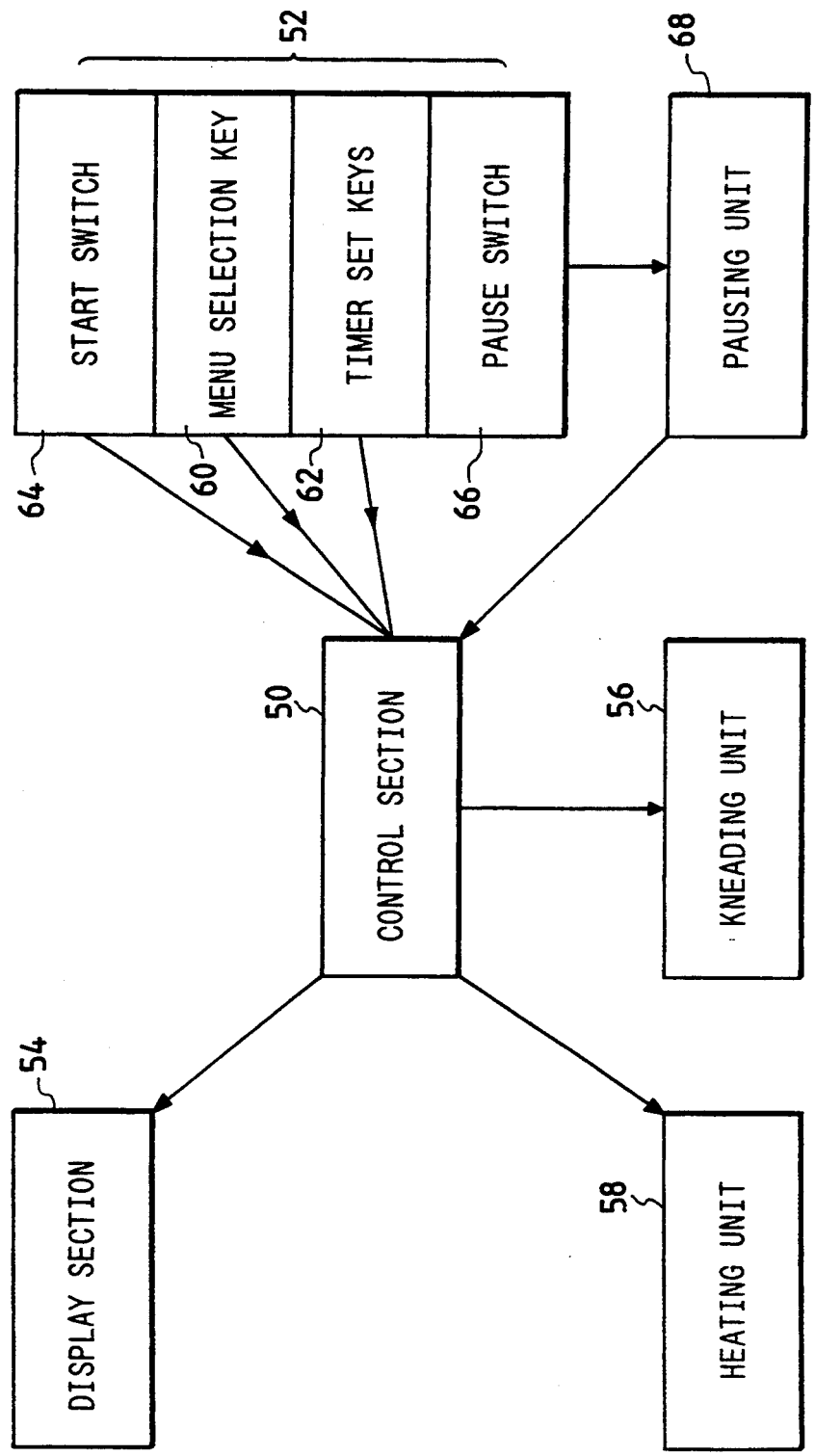
FIG. 2 is a block diagram showing control of the bread making machine of FIG. 1.

A cylindrical inner case 18 is placed inside the main body 2. That is, the cylindrical inner case 18 is located at a position above a main body bottom wall 14 while interposing a predetermined space 16 therebetween and just under the lid 6. Within the space 16 are not only a display (not shown) for displaying data such as conditions and time corresponding to the operation panel 4, but also an input/output control circuit board 20 and an operation circuit board 22 arranged at positions closer to the front. It should be noted that the operation panel 4 includes a pause switch 66, a menu selection key 60, timer set keys 62, and a start switch 64 (FIG. 2).

In the aforementioned main body 2, a support plate 24 is erected from the main body bottom wall 14. The inner case 18 is fixed on top of the support plate 24. An annular heater 26 which is an electrothermic member is arranged at the inner peripheral portion of the inner case 18. An oven chamber 25 is formed of the inner case 18 and the lid 6. A cylindrical bread case 28 having an opening on top thereof is releasably attached to a part 24A of the support plate 24, the part 24A being projected from the middle of the bottom of the inner case 18. A kneading blade 30 for mixing and kneading ingredients poured into the bread case 28 is attached to a rotary shaft 32 that passes through the bottom of the bread case 28.

The rotary shaft 32 having the kneading blade on top thereof passes through a bearing plate 34 fixed on the support plate 24 and is connected to a timing pulley 36. The kneading blade 30 is driven by a main motor 38 arranged within the space 16. The main motor 38 transmits a rotating force thereof to the kneading blade 30 via a timing pulley 40, an endless belt 42, the timing pulley 36, and the rotary shaft 32.

An outside air inlet passage 44 is arranged inside the main body 2. Outside air is introduced by a fan 45 from the opening of the main body bottom wall 14, and the introduced air is blown into the bread case 28 through a duct 46. The fan 45 is driven by a fan motor 47.

Further, a sensor 48 for detecting the inside temperature of the oven chamber 25 is attached to an outer circumferential portion of the inner case 18, and detects the inside temperature of the oven chamber 25 indirectly.

FIG. 2 is a block diagram showing control of the bread making machine.

In FIG. 2, a control section 50 is a block effecting control over various input/output units and the like. The start switch 64, the menu selection key 60, the timer set keys 62, and the like are connected to the control section 50 to apply input information to the control section 50.

The pause switch 66, which is a part of an input section 52, is connected to a pausing unit 68, and applies input information thereof to the pausing unit 68. The pausing unit 68 delivers a signal for stopping or resuming the bread making operation to the control section 50.

The display (not shown), which is a display section 54, the annular heater 26, which is a heating unit 58, and the main motor 38, which is a kneading unit 56, are also connected to the control section 50. The control section 50 controls the operations of the respective blocks 54, 56 and 58.

Although omitted in FIG. 2, the fan motor 47, the sensor 48, and the like are also connected to the control section 50.

The control section 50 not only controls the bread making operation in accordance with the input information from the input section 52 and the pausing unit 68, but also displays a bread making program currently selected, a bread making end time, the current time, and the like on the display section 54. In addition, the control section 50 controls the operations of the kneading unit 56 and the heating unit 58 in accordance with the input information from the input section 52 and the pausing unit 68 as well as with the temperature information from the sensor 48.

Figure 3:
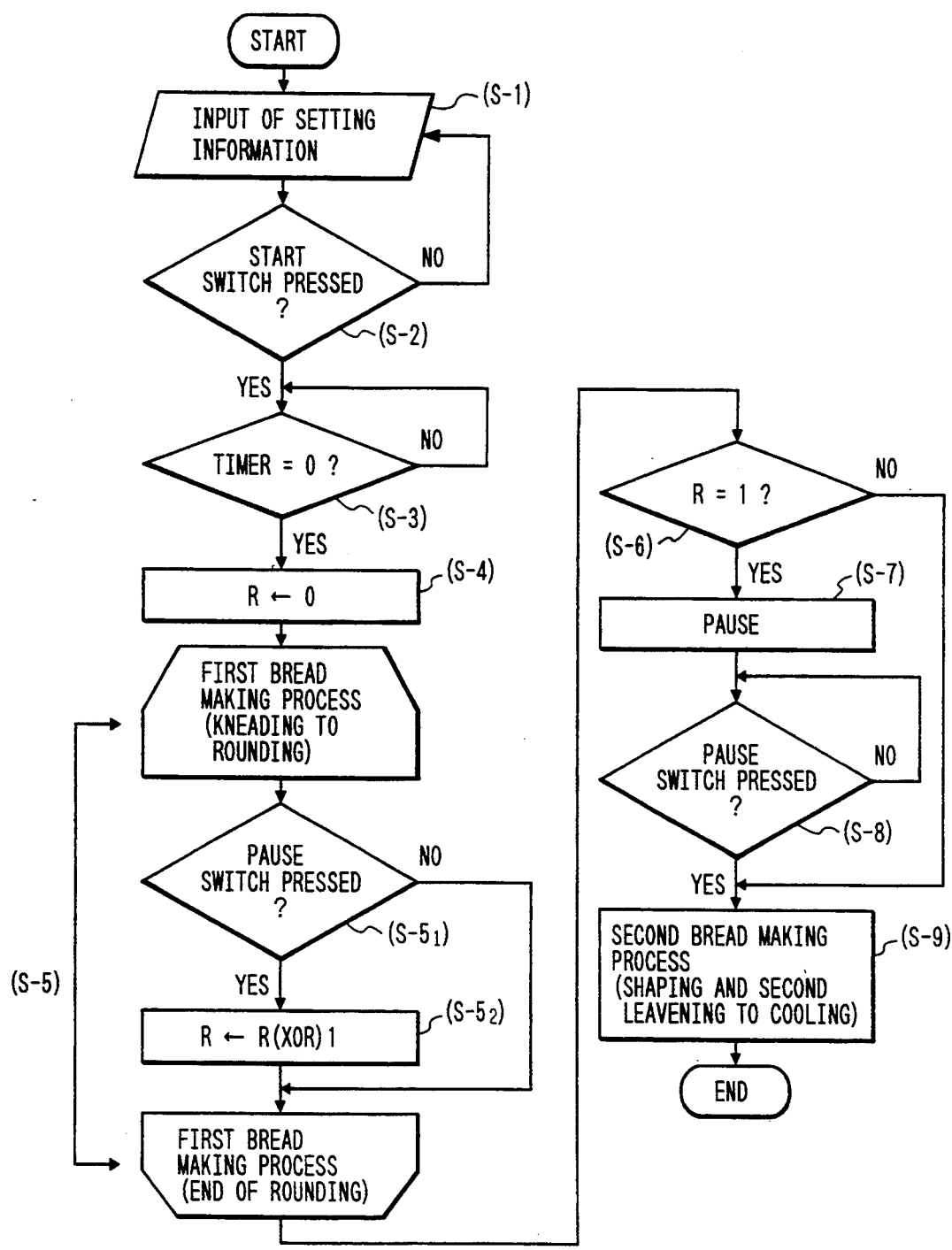
FIG. 3 is a flowchart showing a mode of operation of the bread making machine of FIG. 1.
Figure 4:
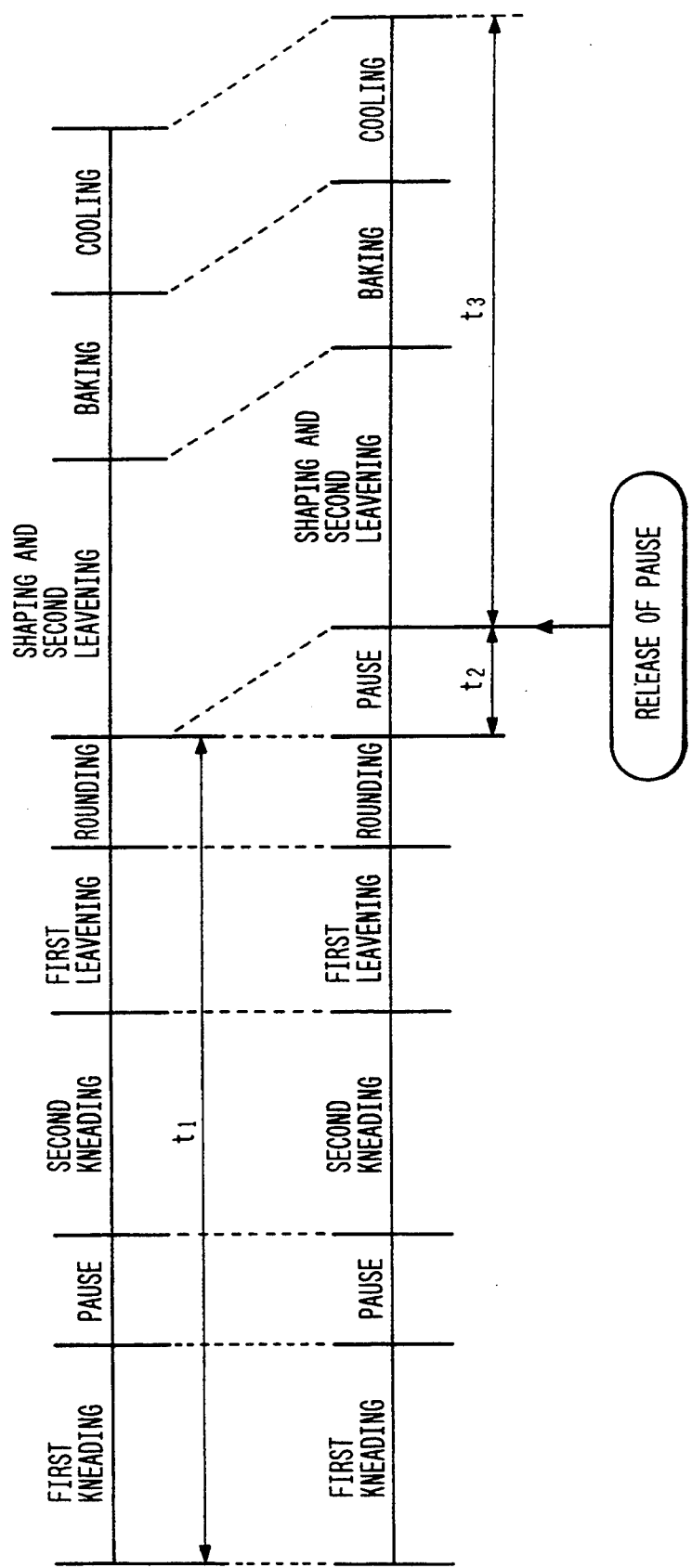
FIG. 4 is a diagram showing a bread making process by the bread making machine.

FIG. 3 is a flowchart showing a mode of operation of the bread making machine shown in FIGS. 1 and 2. FIG. 4 is a diagram showing a bread making process of the bread making machine in FIG. 3. The mode of operation of the bread making machine, which is the first embodiment of the invention, will hereunder be described with reference to FIGS. 3 and 4.

Ingredients such flour and water is poured into the bread case 28, and then pieces of setting information such as menu selection and timer settings are inputted through the menu selection key 60, the timer set keys 62, and the like (Step S-1).

This setting information input step is repeated until the start switch 64, which is a part of the input section 52, is pressed (Step S-2).

Then, whether a timer has been set is judged. If the timer has been set, a bread making start time is calculated from the finish time as set, and a comparison is made between the time indicated by a clock device (not shown) built in the bread making machine and the bread making start time. When the difference between the bread making start time and the time indicated by the clock device becomes zero, a next step is taken (Step S-3).

If the timer is not set, the aforementioned loop is skipped, and a next step is started.

Then, an initial value "0" is set to a memory R, which is the setting information of the pausing unit 68 that applies a signal to the control section 50 so that the bread making operation is stopped before a succeeding baking process is started (Step S-4).

A first bread making process is thereafter started (Step S-5).

The first bread making process covers a first kneading process to a rounding process in the process diagram shown in FIG. 4.

In the first bread making process, the pressing of the pause switch 66 that gives a setting input to the pausing unit 68 is detected (Step S-$5_1$), and if the pause switch 66 has been pressed, the value in the memory R and 1 are EXCLUSIVE ORed and the obtained value is substituted to the memory R (Step S-$5_2$).

It should be noted that this step (Step S-5) is repeated until the first bread making process is ended.

Then, upon end of the first bread making process, the pausing unit 68 judges whether the memory R, which is the setting information, is equal to 1 (Step S-6). If R=1, the pausing unit 68 applies a stop signal to the control section 50, and the control section 50 in turn stops the bread making operation based on the stop signal (Step S-7).

The stoppage of the bread making operation continues until the pause switch 66 is pressed again. Upon pressing of the pause switch 66, the pausing unit 68 applies a bread making resume signal to the control section 50, and the control section 50 in turn resumes the bread making operation based on the resume signal (Step S-8).

In both cases where the stop signal is not applied to the control section 50 after the first bread making process has ended and where the bread making resume signal is applied to the control section 50 after tile bread making operation has been stopped, the control section 50 starts a second bread making process, and the whole bread making process is ended upon end of the second bread making process (Step S-9).

It should be noted that the second bread making process covers a shaping and second leavening process to a cooling process in the process diagram shown in FIG. 4.

A mode of operation of the bread making process will be described next with reference to FIG. 4.

The first bread making process includes: the first kneading process; a pausing process; a second kneading process; a first leavening process; and the rounding process. The control section 50 controls so that these processes are sequentially performed. More specifically, in the first kneading process the kneading unit 56 is operated to mix and knead the ingredients by the rotation of the kneading blade 30. In the pausing process the kneading unit 56 is stopped, and in the second kneading process the kneading unit 56 is operated. In the first leavening process the kneading unit 56 is stopped, and in the rounding process the kneading unit 56 is operated for a short period of time. It should be noted that if necessary in each of these processes, and particularly if the inside temperature of the oven chamber 25 is as low as to prevent the yeast from leavening, the bread making machine may be operated so that the temperature of the oven chamber 25 can be maintained constant by the heating unit 58. Within a first bread making process period $t_1$, $R=1$ is set to the pausing unit 68 by the pause switch 66 being pressed an odd number of times in the aggregate, and $R=0$ is set to the pausing unit 68 by the pause switch 66 not being pressed or being pressed an even number of times in the aggregate. If $R=1$, the pausing unit 68 applies a stop signal to the control section 50 to stop the bread making operation (hereinafter referred to as "pause").

The pause period $t_2$ is a period between a timing in which the bread making operation is stopped and a timing in which the pause switch 66 is pressed and a resume signal is applied from the pausing unit 68 to the control section 50 to resume the bread making operation.

During the pause period $t_2$, the user takes out a dough from the bread case 28 in the oven chamber 25 and makes special arrangements for the dough by correcting the shape of the dough, brushing beaten egg over the surface thereof, or putting therein fillings such as cream and chocolate for buns. The dough is put back into the bread case 28 after specially arranged, and the bread case 28 is put back into the oven chamber 25.

The pause period $t_2$ is then up when the user presses the pause switch 66, and the control section 50 starts the second bread making process, which includes the shaping and second leavening process, baking process, and cooling process. The control section 50 effects control so that these processes can be performed sequentially. More specifically, in the shaping and second leavening process the heating unit 58 is caused to be operated so that the temperature of the oven chamber 25 can be maintained at such a predetermined level as to activate the leavening of the yeast; in the baking process the heating unit 58 bakes the dough; and in the cooling process the fan motor 47 is activated to cool the baked bread. It should be noted that the shaping and second leavening process may be deemed to have been ended within the pause period and thereby be skipped, and the succeeding baking process may therefore be started immediately after the pause period. When a second bread making period $t_3$ has elapsed, the bread making operation is terminated.

It should also be noted that the elapsed time $t_2$ after the bread making operation has been stopped may be displayed on the display section 54 in the aforementioned embodiment.

A second embodiment of the invention will be described next.

Figure 5:
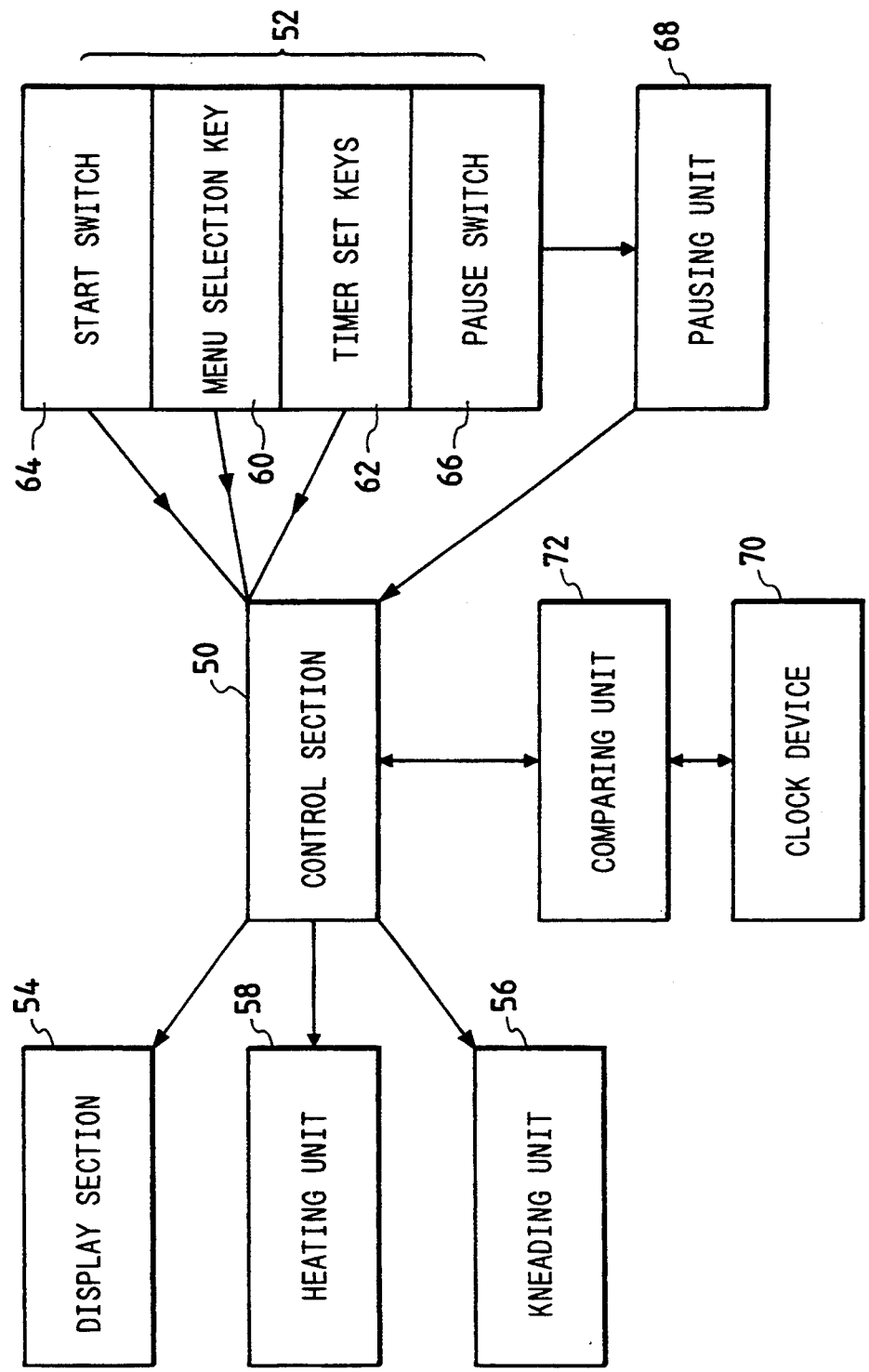
FIG. 5 is a block diagram showing control of a bread making machine, which is a second embodiment of the invention.

FIG. 5 is a block diagram showing control of a bread making machine, which is the second embodiment of the invention. This machine is distinguished from the machine shown in the block diagram (FIG. 2) in having additional devices, which are a clock device 70 and a comparing unit 72. The clock device 70 is a time counting means, and the comparing unit 72 compares a set time with an output of the clock device 70. The clock device 70 is, however, different from a clock device for operating the timer.

Figure 6:
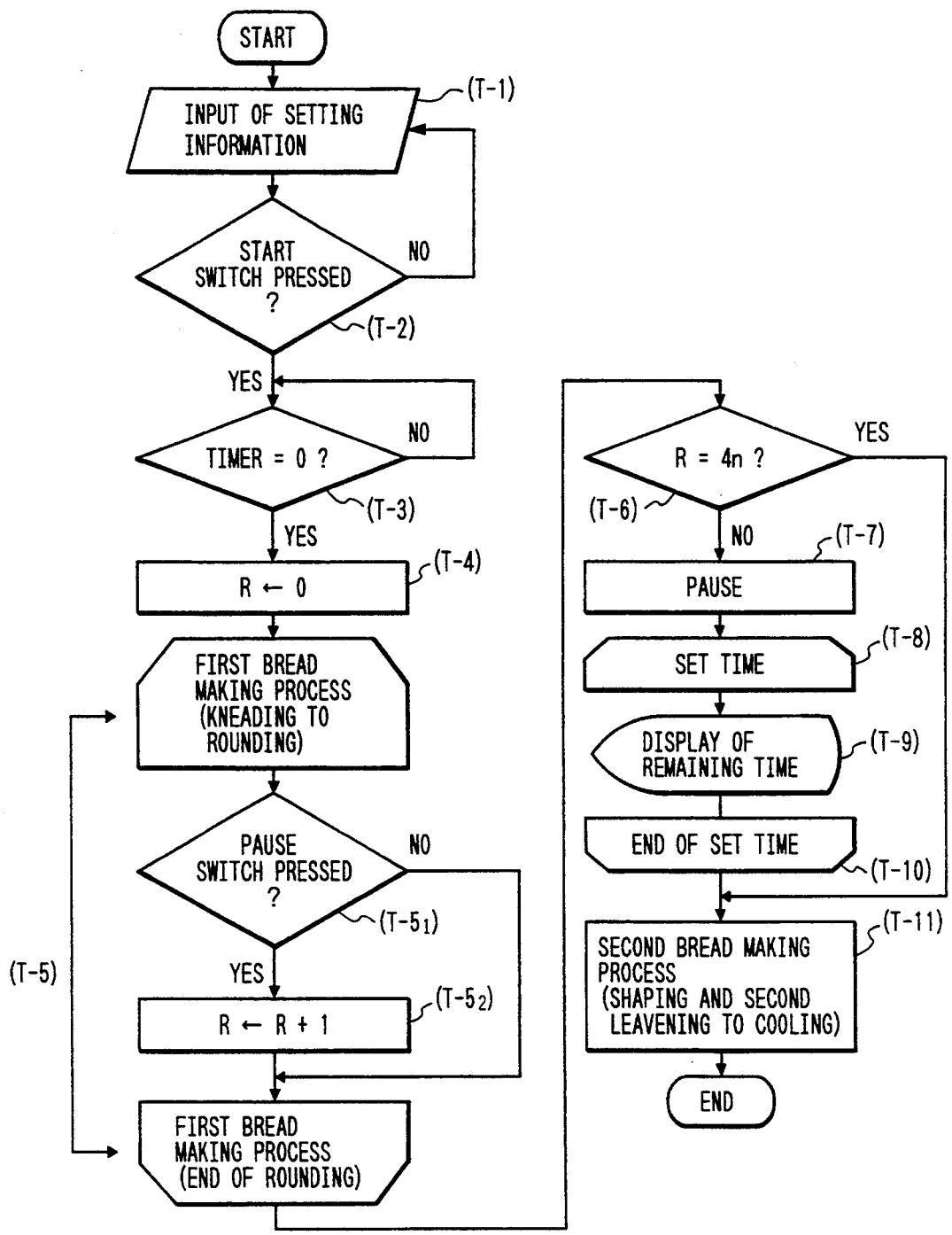
FIG. 6 is a flowchart showing a mode of operation of the bread making machine of FIG. 5.

FIG. 6 is a flowchart showing a mode of operation of the bread making machine, which is the second embodiment of the invention.

Since Steps T-1 to T-4 in FIG. 6 are exactly the same as Steps S-1 to S-4 in the first embodiment, no description thereof will be herein given.

Upon end of Step T-4, the first bread making process is started (Step T-5). In the first bread making process the first kneading process to the rounding process in the process diagram shown in FIG. 4 are performed.

In the first bread making process the pressing of the pause switch 66 that gives a setting input to the pausing unit 68 is detected (Step T-$5_1$). If the pause switch 66 has been pressed, the memory R is incremented by 1 (Step T-$5_2$). It should be noted that this step (Step T-5) is repeated until the first bread making process is ended.

Upon end of the first bread making process, the pausing unit 68 judges whether the memory R is equal to 4n ("n" is a positive integer including 0) (Step T-6). If R is not equal to 4n, the pausing unit 68 applies a stop time signal to the control section 50, and the control section 50 in turn stops the bread making operation by retrieving set time data corresponding to the stop time signal from an internal storage section (not shown) (Step T-7).

The retrieved set time data is then applied to the comparing unit 72.

Also, the clock device 70 detects stoppage of the bread making operation, counts the elapsed time, and delivers the count to the comparing unit 72. The comparing unit 72 then compares the set time from the control section 50 with the count from the clock device 70, maintains the stoppage of the bread making operation until both data coincide with each other, and supplies a bread making resume signal to the control section 50 upon coincidence of both data (Steps T-8 to T-10).

It should be noted that the remaining time of the stop time is displayed on the display section 54 during the bread making operation stoppage (Step T-9).

In the cases where the stop time signal is not fed to the control section 50 after the first bread making process has been ended and where the bread making operation resume signal is applied to the control section 50 after the bread making operation has been stopped, the control section 50 starts the second bread making process, and the whole bread making operation is ended upon end of the second bread making process (Step T-11). It should be noted that in the second bread making process the shaping and second leavening process to the cooling process shown in the process diagram in FIG. 4 are performed.

The bread making process according to the second embodiment will be described with reference to FIG. 4. The same process steps as those in the first embodiment will be omitted.

During the first bread making process period $t_1$ the memory R is incremented by 1 every time the pause switch 66 is pressed. After the first bread making period has elapsed, the second bread making process is successively started if $R=4n$.

If R is not equal to 4n, then the pausing unit 68 applies a pulse signal (stop time signal) equivalent to a remainder obtained from the division of R by 4 to the control section 50.

The control section 50 not only stops the bread making operation upon reception of the stop time signal, but also applies the set time data corresponding to the inputted pulse signal to the comparing unit 72. (For example, 10 minutes if m=1, 30 minutes if m=2, and 60 minutes if m=3, where "m" is the number of pulses.)

The comparing unit 72 outputs a count start command to the clock device 70, and the clock device 70 starts counting the elapsed time upon reception of the count start command and gives the count back to the comparing unit 72.

The comparing unit 72 applies a bread making operation resume signal to the control section 50 when the set time data coincides with the count. Since the pause period $t_2$ between the bread making operation stoppage and the bread making operation resumption becomes equal to the set time data, the remaining time up to the resumption of the bread making operation is displayed on the display section 54 during the pause period $t_2$. It should be noted that the user can make necessary arrangements for the dough in a manner similar to that in the first embodiment during the pause period $t_2$.

Upon reception of the bread making operation resume signal from the comparing unit 72, the control section 50 starts the second bread making process.

Upon elapse of the second bread making process period $t_3$, the whole bread making operation is terminated.

It should be also noted that while the pause period $t_2$ comes in three pieces of time data in the second embodiment, the invention is not limited thereto; the pause period $t_2$ may have only one piece of time data or two or more pieces of time data.

In addition, the clock device 70 may be used also as the clock device for operating the timer.

While the same bread baking case is used in the first bread making process performing mixing and kneading and the like and in the second bread making process performing baking and the like in both the first and second embodiments, a separate oven case for heating with the oven may be used in the second bread making process.

Further, while the pausing unit is used also as the resuming unit in the first embodiment and the resuming unit (comparing unit) is disposed separately from the pausing unit in the second embodiment, the invention is not limited thereto. That is, another switch (e.g., the start switch) may be used also as a switch for giving a pause input from the user to apply the input signal directly to a microcomputer to cause the microcomputer to execute various types of processing and apply the corresponding signals to a control section within the microcomputer. Alternatively, a pause reset button for resetting pause setting input data may be arranged so that a bread making operation resume signal may be applied during the pause period by pressing the pause reset button.

Still further, while the second bread making process starts with the shaping and second leavening process in both the first and second embodiments, the second bread making process may start with the baking process by deeming the shaping and second leavening process time to have been ended within the pause period.

It should be noted that although not described in the first and second embodiments, the setting of the pause mode may be displayed on the display section when the pause mode has been set. In addition, the elapsed time after the pause start may be displayed on the display section during the pause period. Moreover, an alarming means such as a buzzer may be operated to alarm the user at the pause start time and/or immediately before the resumption of the bread making operation.

The invention is characterized as arranging both the pausing unit that applies a signal to the control section so that the bread making operation is temporarily stopped before the bread making machine starts the baking process and the resuming unit that applies a signal to the control section so that the bread making operation stopped by the pausing unit is resumed. Therefore, buns such as jam buns as well as rolls such as croissants requiring special arrangements in the course of the bread making operation can be baked without involving a separate heating device, thereby rendering the operation simple in baking buns and rolls.

The invention is further characterized as forming the resuming unit of both the counting unit that counts the elapsed time from the stoppage of the bread making operation made by the pausing unit and of the comparing unit that applies a signal to the control section so that the bread making operation is resumed when the time counted by the counting unit coincides with the set time. Therefore, the bread making operation can be resumed before the quality of the ingredients is impaired, which in turn prevents low-quality bread from being baked.

The invention is still further characterized as having the display unit that displays the elapsed time from the stoppage of the bread making operation made by the pausing unit and/or the time up to when the bread making operation is resumed by the resuming unit. Therefore, the time in which the dough is being specially arranged and/or the time up to the resumption of the bread making operation can be informed, which in turn prevents erroneous resumption of the bread making operation with no dough in the bread making machine before the end of the special arrangements for the dough.

What is claimed is:

1. A bread making machine having a bread case being releasably attached to an oven chamber and receiving ingredients therein and subjecting the ingredients to bread making processes such as a kneading process, a leavening process, and a baking process within the same oven chamber, said bread making machine comprising:
   kneading means for mixing and kneading the ingredients to make a dough;
   heating means for baking the dough;
   control means for not only controlling the kneading process, the leavening process, and the baking process, but also stopping a bread making operation upon input of a first signal and resuming the bread making operation upon input of a second signal;
   pausing means for applying the first signal to said control means to stop the bread making operation before the baking process; and
   resuming means for applying the second signal to said control means to resume the bread making operation stopped by said pausing means.

2. The bread making machine according to claim 1, wherein said pausing means and said resuming means are included in a single means.

3. The bread making machine according to claim 1, further comprising a pause switch for giving a setting input to said pausing means.

4. The bread making machine according to claim 3, wherein said pausing means applies the first signal to said control means when said pause switch is pressed an odd number of times in the aggregate.

5. The bread making machine according to claim 1, further comprising alarming means for alarming a user at the time of at least one of when the bread making operation is stopped and immediately before the resumption of the bread making operation.

6. The bread making machine according to claim 1, wherein said resuming means includes: counting means for counting an elapsed time from stoppage of the bread making operation made by said pausing means; and comparing means for comparing the time counted by said counting means with a set time, the second signal being applied to said control means from said comparing means to resume the bread making operation when the counted time coincides with the set time.

7. The bread making machine according to claim 6, further comprising display means for displaying at least one of the elapsed time from the stoppage of the bread making operation made by said pausing means and a time up to resumption of the bread making operation made by said resuming means.

* * * * *